US009450413B2

(12) United States Patent
Galler et al.

(10) Patent No.: US 9,450,413 B2
(45) Date of Patent: Sep. 20, 2016

(54) POWER REGULATING SYSTEM FOR SOLAR POWER STATION

(75) Inventors: Stefan Galler, Berlin (DE); Jens Kessler, Berlin (DE)

(73) Assignee: Skytron Energy GmbH, Berlin (DE)

( * ) Notice: Subject to any disclaimer, the term of this patent is extended or adjusted under 35 U.S.C. 154(b) by 738 days.

(21) Appl. No.: 13/390,980

(22) PCT Filed: Aug. 11, 2010

(86) PCT No.: PCT/DE2010/000966
§ 371 (c)(1),
(2), (4) Date: May 2, 2012

(87) PCT Pub. No.: WO2011/020466
PCT Pub. Date: Feb. 24, 2011

(65) Prior Publication Data
US 2012/0217807 A1 Aug. 30, 2012

(30) Foreign Application Priority Data

Aug. 19, 2009 (DE) .......................... 10 2009 038 024
Jun. 3, 2010 (DE) .......................... 10 2010 023 113

(51) Int. Cl.
*H02J 1/00* (2006.01)
*H02J 3/00* (2006.01)
*H02J 3/38* (2006.01)

(52) U.S. Cl.
CPC ............... *H02J 3/382* (2013.01); *H02J 3/381* (2013.01); *Y10T 307/555* (2015.04); *Y10T 307/718* (2015.04)

(58) Field of Classification Search
CPC ............ Y10T 307/718; Y10T 307/50; Y10T 307/707; H02J 3/383; H02J 3/382; H02J 3/24; H02J 3/00; H02J 5/00

USPC ..................................................... 307/82, 84
See application file for complete search history.

(56) References Cited

U.S. PATENT DOCUMENTS

| | | |
|---|---|---|
| 5,255,178 A | 10/1993 | Liberati |
| 7,606,638 B2 | 10/2009 | Fortmann et al. |
| 2008/0212343 A1 | 9/2008 | Lasseter et al. |
| 2009/0160187 A1* | 6/2009 | Scholte-Wassink ............ 290/44 |
| 2010/0181830 A1* | 7/2010 | Fornage et al. ................ 307/18 |
| 2010/0208501 A1* | 8/2010 | Matan ....................... H02J 3/18 363/95 |

(Continued)

FOREIGN PATENT DOCUMENTS

| | | |
|---|---|---|
| AT | 130532 | 12/1995 |
| DE | 658049 | 3/1938 |

(Continued)

OTHER PUBLICATIONS

Notice of Acceptance issued by the Australian Patent Office on Aug. 21, 2013 in Australian Application No. 2010285341.
Brauner, "Netzanbindung von Windkraftanlagen," in e&i, vol. 116 (7-8), Jul. 1999, pp. 428-432 (English Abstract on front page).

*Primary Examiner* — Carlos Amaya
(74) *Attorney, Agent, or Firm* — MacMillan, Sobanski & Todd, LLC

(57) ABSTRACT

The invention relates to a system for the dynamic regulation of a regenerative energy generation installation comprising a plurality of energy generation units. The system has a signal input for receiving a pre-determined set value, a measuring device for measuring an actual value on an output of the energy generation installation, and a regulating device for regulating the energy generation units based on the set value and the measured actual value.

19 Claims, 2 Drawing Sheets

(56) References Cited

U.S. PATENT DOCUMENTS

2010/0231045 A1\* 9/2010 Collins .................. F01B 21/04
  307/47

FOREIGN PATENT DOCUMENTS

| DE | 102004048341 A1 | 4/2006 |
| EP | 1 783 365 A2 | 5/2007 |

\* cited by examiner

POWER REGULATING SYSTEM FOR SOLAR POWER STATION

CROSS-REFERENCE TO RELATED APPLICATIONS

This is the U.S. national stage of International application PCT/DE2010/000966, filed Aug. 11, 2010 designating the United States and claiming priority to German applications DE 10 2009 038 024.8, filed Aug. 19, 2009 and DE 10 2010 23 113.4, filed Jun. 3, 2010.

BACKGROUND OF THE INVENTION

The invention relates to power station monitoring and regulating concepts taking into account the further development of requirements for the operation of photovoltaic energy generation installations.

The expansion of renewable energies results in new requirements for the availability and operational reliability of energy supply networks as time-dependent fluctuations in energy demand are now accompanied by a fluctuating, hard-to-predict energy supply.

In order to ensure a highly available and stable supply network also for the future, the legislator and the association of energy network operators laid the legal and technical bases for integrating regenerative energy generation installations with more than 100 kWp as controllable power stations into the existing supply networks by adopting the amendment of the Renewable Energies Sources Act (EEG) (October 2008) and the Medium-Voltage Directive of the BDWE (January 2009).

This creates new requirements for the planning, system engineering and operation of photovoltaic power stations. A safe process control system and an intelligent power station management are particularly important for an efficient and cost-effective realisation.

Network operators have not yet been able to define uniform, detailed requirements for network security management, power station regulation, protective functions and the used process control interfaces. At present, this results in very different requirements depending on the voltage level of the network connection point and the responsible network operator. A consultation with the responsible network operator on the requirements for participating in network security management is therefore recommended when applying for network connection.

In general, installations with an installed capacity of more than 100 kW are required to participate in network security management. In this respect, the network operator may limit the active power supplied by the photovoltaic power station to a certain percentage of the power station's installed capacity (currently 100%, 60%, 30%, 0%) by specifying a capacity level. This is accomplished by means of a process control interface defined by the network operator to which the power station regulating system is connected. The network operator may have to be informed of the successful realisation of this specification via the process control system.

So far, capacity reduction has only been described in the art as pure control. This means, a set point command coming from the electric utility is directly sent to all inverters present in the power station, and all are reduced to the same percentage value. Due to losses in the internal power transfer within the power station and possible unavailability of inverters (e.g. units shut down for repair purposes), this causes yield losses beyond the required reduction.

The object of the invention is to provide a system which is free of the disadvantages of the state of the art.

SUMMARY OF THE INVENTION

This object is solved by means of the features of claims 1, 9 and 12. Advantageous embodiments of the invention are defined in the dependent claims.

According to a first aspect of the invention, a system for regulating a regenerative energy generation installation comprising a plurality of energy generation units comprises a signal input for receiving a pre-determined set value, a measuring device for measuring an actual value on an output of the energy generation installation, and a regulating device for regulating the actual value to the set value by regulating the individual energy generation units. Instead of simple monitoring, the invention provides a regulating device, which increases reliability and efficiency.

Regulated variables of the regulating device may be active power, reactive power, displacement factor, power factor, mains frequency and/or mains voltage.

The regulating device can additionally process measured values of the energy generation units.

The system for dynamic regulation may comprise one or several interface units for different types of energy generation units.

Passive elements of the energy generation installation can be taken into account by the regulating device.

The system for dynamic regulation may comprise a signal output for information feedback to a superordinate system, such as a network control centre or a control computer of a power station. Thus, the regulating device can also be extended to the superordinate level.

The set value can be received by a superordinate system, such as a network control centre or a control computer of a power station.

The regulating device can have a PID controller which can be realised in an easy and sturdy manner. Other classical controllers and further controllers such as neural networks can be used.

According to another aspect of the invention, a regenerative energy generation installation comprising a plurality of energy generation units comprises a system for dynamic regulation of the energy generation installation as described above. The connection of the regenerative energy generation installation and the system for dynamic regulation of the energy generation installation has the advantage that no or only few measures are required regarding logs and/or interfaces.

The energy generation unit can, e.g., be an inverter, rectifier or DC/AC converter.

The regenerative energy generation installation may comprise a photovoltaic energy generation installation. At times, photovoltaic energy generation installations can exhibit a strongly fluctuating output power, such that they are pre-destined for the invention.

According to another aspect of the invention, a method for regulating a regenerative energy generation installation comprising a plurality of energy generation units comprises the steps:
  receiving a set value,
  measuring an actual value on an output of the energy generation installation,
  and
  regulating the individual energy generation units for regulating the actual value to the set value.

The set value can be received by a superordinate system, such as a network control centre or a control computer of a power station.

Information can be sent to a superordinate system, such as a network control centre or a control computer of a power station. Thus, the regulating device can be extended to the superordinate level.

Further measured values from the energy generation installation and/or external measured values can be processed for rendering the control even more intelligent, i.e. rendering it even more adjustable to the given situation.

The invention extends the range of photovoltaic system technology from comprehensive, manufacturer-independent monitoring of large photovoltaic power stations to complete control room functionality with intelligent concepts of power station regulation.

The concepts support and improve the power stations with monitoring. The main purpose is capacity reduction upon request by the electric utility. A regulation by measuring the actual output power of the power station and comparison to the specification and a corresponding readjustment of inverter control in a closed-loop regulation chain can help avoid said yield losses.

This concept of closed-loop regulation can be additionally improved by using the data obtained through monitoring. To this end, the current availability and load of all installation components are included in regulation calculation and thus, the capacity to be reduced is spread over individual inverters. On the one hand, this helps to regulate the power station in any state very quickly and efficiently. On the other hand, it is also possible to integrate inverters of different installed capacity and even of various manufacturers into the power management of one power station and distribute the load (or reduced load due to reduction) dynamically.

This concept can also be applied to the regulation of electrical parameters at the network connection point (such as displacement factor cos-phi, mains frequency or mains voltage). In particular, the compensation of reactive power would be advantageous for active power yield and load distribution in the power station thanks to a differentiated regulation designed for every inverter.

Possible additional requirements of individual photovoltaic power stations which can be operated by the regulating device of the invention may include the following points, but are not limited to this list:
- stabilisation of the displacement factor (cos $\phi$) to a fixed, pre-determined value at the network connection point;
- stabilisation of the displacement factor (cos $\phi$) to a variable value pre-determined by the network operator via a process control interface at the network connection point;
- readjustment of the displacement factor (cos $\phi$) depending on the active power fed in or the existing mains voltage according to a pre-determined curve at a pre-determined speed;
- provision of short-circuit current (fault ride through);
- active power reduction up to over- or underfrequency tripping according to a pre-determined diagram;
- disconnection of the generation installation in case of under- or overvoltage according to a pre-determined voltage-time diagram;
- transmission of the actual values to the network operator via a pre-determined process control interface.

The invention covers the following points:
- hard- and software for the process control system with interfaces to:
    - transducers in the power station and at the network connection point
    - radio ripple receivers and process control interfaces of the network operator
    - inverters of various manufacturers;
- active power limitation according to specifications by the network operator to a pre-determined limitation level within a pre-determined time (standard: one minute);
- slow, controlled start-up of derated power stations after lifting of the active power limitation by the network operator;
- reactive power regulation at the network connection point to a pre-determined static or variable displacement factor (cos $\phi$);
- reactive power regulation at the network connection point to a pre-determined displacement factor (cos $\phi$) independent of active power or mains voltage;
- reactive power compensation of passive reactance in the energy distribution of the power station (e.g. long underground cable routes to a transmission substation) from a minimum active power fed in.
- mains frequency-based active power reduction in case of deviations in mains frequency for network stability;
- monitoring of all switching operations of the power station's protective functions (over- or undervoltage tripping);
- partial realisation of the power station's protective functions, such as tripping of continued short circuits (unless this is ensured by each individual inverter on the low-voltage side);
- actual and set value feedback of the power station regulating system to the network operator via multiple communication and process control interfaces;
- feedback of a real-time yield prediction of the currently possible active power supply to the network operator (for determining the yield losses in case of active power limitation);
- integration of all measured and regulating values and all parameters of the power station regulating system into the continuous power station monitoring for:
    - status feedback of the power station regulating system
    - functional and error check of the power station regulating system
    - automatic error message in case of deviations from set standards of the power station regulating system
    - archiving of all specification events of the network operator and the corresponding control and regulation operations in monitoring for subsequent verification of reaction times and yield losses.

BRIEF DESCRIPTION OF THE DRAWINGS

In the following, drawings are used to describe the invention in greater detail, in which is shown.

The drawings merely serve the purpose of illustrating the invention and are not intended as a limitation. The drawings and the individual parts are not necessarily to scale. The same reference signs refer to same and similar parts.

DETAILED DESCRIPTION OF THE INVENTION

Figure 1:
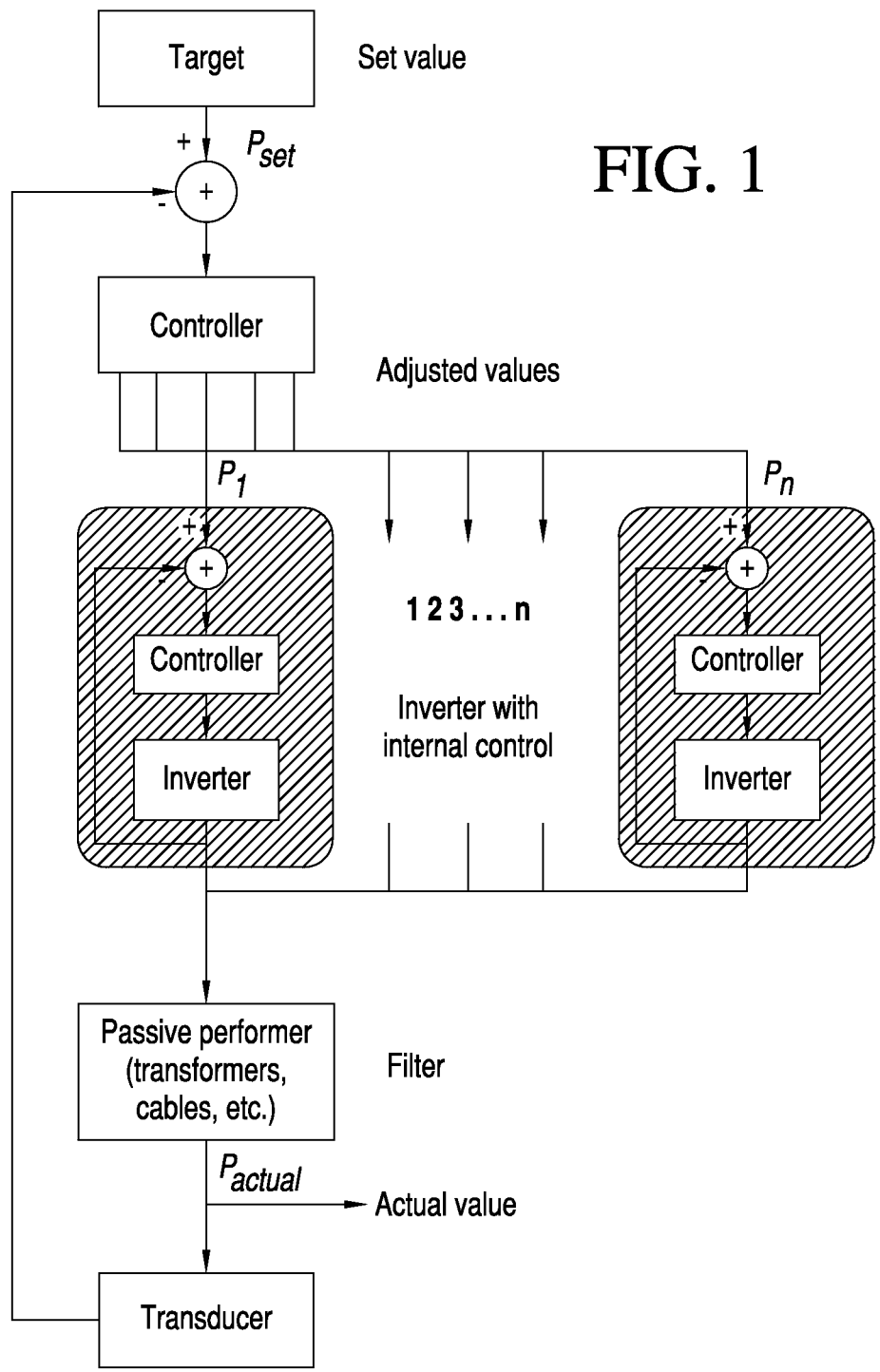
FIG. 1 a block diagram of a system for monitoring a regenerative energy generation installation.

FIG. 1 schematically shows a block diagram of the system for dynamic monitoring of a regenerative energy generation installation. As an example, the energy generation installation may be a solar, wind or hydroelectric power station. The energy generation installation comprises a plurality of energy generation units in the form of inverters. Such inverters are regulated for adjusting the capacity (P, Q) and/or electrical parameters (displacement factor, power factor, mains frequency and/or mains voltage) on the output or network feed-in point of the energy generation installation to certain specifications. In a first step, the system monitors the regenerative energy generation installation and, in a second step, the system regulates the installation.

The specifications may, for instance, be transmitted as individual values or common vector by a superordinate system such as a network control centre to the energy generation installation or originate from a control computer of the energy generation installation. The specifications or set values can be dynamic or static. For the reactive power Q, e.g. a fixed value or dependence on the active power supplied or on the mains voltage can be specified. A specification of a fixed value or a specification of a certain reduction or increase within a certain time can be realised by the regulating device.

The specification or the set value is provided to the regulating device, e.g. a PID controller. Just like an actual value which is measured on the output or network connection point of the energy generation system by a transducer or measuring converter. The controller controls several inverters which may also be of different design. For this purpose, one or several interface units can be provided for operating the various logs or signal levels of the inverters. The interface unit can be integrated into the controller or be a stand-alone unit.

The regulating system can receive measured values of the inverters in order to, e.g., integrate their availability, load, operating point into regulation for minimising losses. Furthermore, the controller can take into account passive power elements such as transformers, lines, etc. and the topology such as different line lengths or qualities for regulation in order to minimise losses.

This system regulates the distributed system of energy generation units in order to prevent or minimise losses due to reduced feed-in or non-optimum use of the resources of the energy generation installation.

Figure 2:
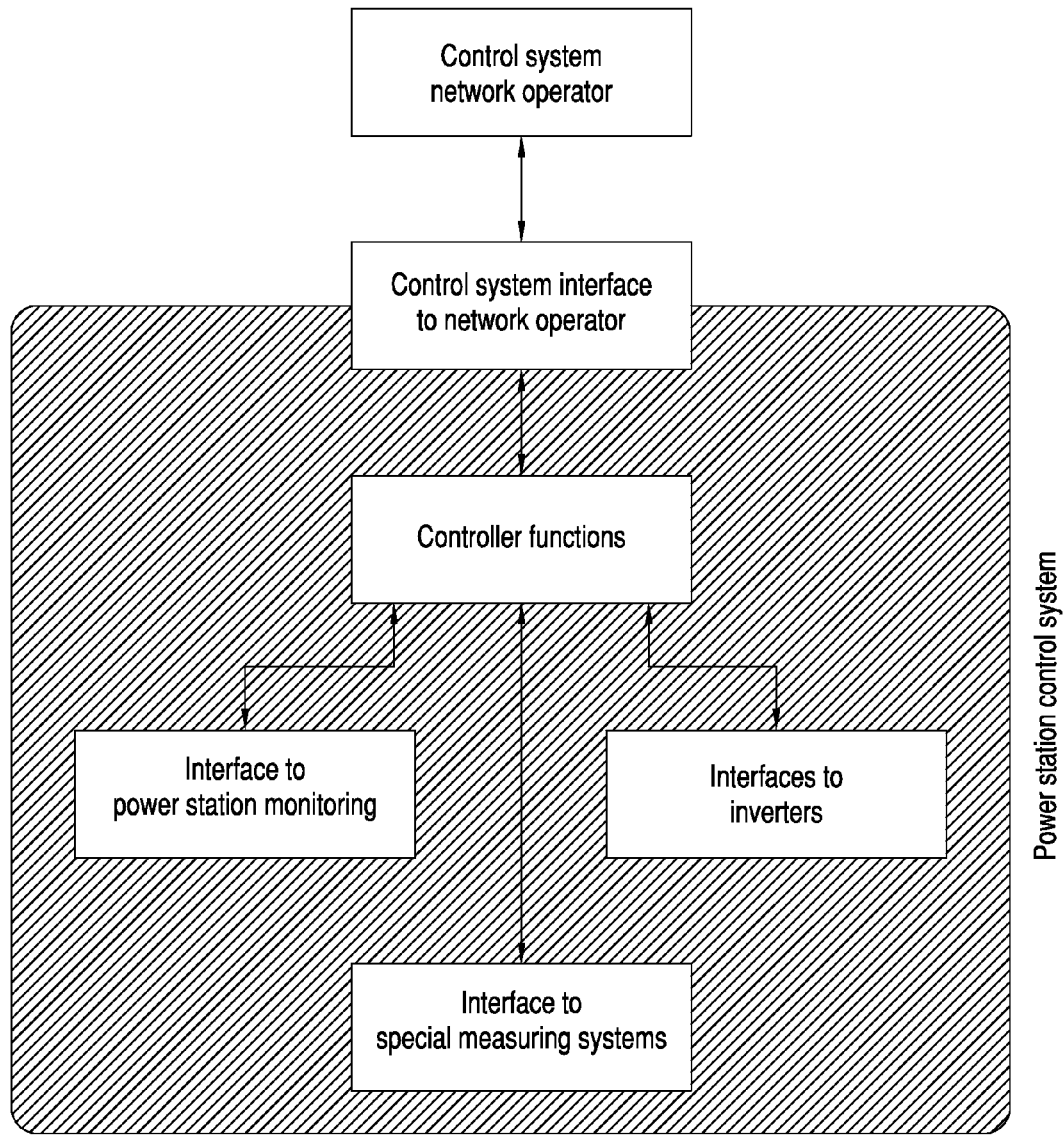
FIG. 2 a block diagram of a power station regulating system.

FIG. 2 shows a schematic representation of the power station regulating system, i.e. the environment into which the system of FIG. 1 is embedded. As an example, a control centre of the network operator comprising a control system communicates with the power station regulating system in order to specify values and obtain information and measured values on the state of the power station. To this end, the power station regulating system has a control system interface. The communication between the control system interface and the control system of the network operator occurs via wired or wireless communication channels known in the art.

The control system interface is directly or indirectly connected to the controller functions of the power station regulating system. The controller functions correspond to the inner part of the regulation loop of FIG. 1, i.e. to the controller and the consideration of the passive power elements according to FIG. 1. The controller functions have one or several bidirectional interfaces to the inverters as already discussed in FIG. 1.

In addition, the controller functions have one or several bidirectional interfaces to the power station monitoring in order to obtain and take into account information on the state of the overall power station for regulation. Moreover, the controller functions can output values and/or results from the regulating device to the power station monitoring such that the latter can process them.

The controller functions have one or several bidirectional interfaces to special measuring systems in order to be able to include further information into the regulating device. The special measuring systems can e.g. comprise transducers monitoring the network feed-in point. The special measuring systems can provide further measured values from the power station and external data, such as real-time insolation data, temperature influences, wind measurement data and weather forecasts for intelligent regulation. Moreover, the special measuring systems can provide all measured values, conditions or specifications important or desirable for regulation to the controller functions.

As additional input data for the regulating device or the controller functions, energy forecast values for both the primary energy supply (sun, heat, wind) and the load demand in the energy network (load profiles) are used. Such input data can be obtained via data interfaces from the electric utility, power station operator or an external service provider and used for regulating the installation.

Furthermore, energy storage concepts are integrated into the power station regulating system. To this end, data interfaces are intended to energy storage systems such as flywheel mass storage systems, battery systems, compressed-air storage systems, pumped-storage systems, etc. Moreover, the system analyses requirements of the electric utility or operator in order to provide energy quantities on a short- and medium-term basis via input interfaces. The data and input interfaces can be analogous or digital. A feedback on the amount of energy available in the storage systems and an intelligent estimate as to the energy reserves to be expected in the forecast period is intended to be provided to the electric utility, power station operator or other superordinate control system.

The system also regulates and monitors cogenerative systems. These are combined systems of generation units with different primary energy sources. Thus, a complete installation, comprising, e.g., photovoltaic inverters, wind turbines, a battery storage system and emergency power system running on diesel, can be regulated and monitored by a central controller to and for external requirements regarding active and reactive power, frequency and mains voltage behaviour, etc.

The invention claimed is:

1. A system for regulating a regenerative energy generation installation comprising a plurality of energy generation units, comprising
    a signal input for receiving a pre-determined set value,
    a measuring device for measuring an actual value at a grid connection point of the energy generation installation, and
    a regulating device for regulating the actual value to the set value by regulating the individual energy generation units,
    wherein the set value originates as individual values or a common vector from a control computer of the energy generation installation,
    wherein the regulating device processes additional measured values of the energy generation units, and
    wherein the regulating device stabilizes a displacement factor to a fixed, pre-determined value or stabilizes the displacement factor to a variable value pre-determined by a network operator via a process control interface, at a network connection point when regulating the actual value to the set value.

2. The system for dynamic regulation of a regenerative energy generation installation of claim 1, wherein the regulated variables are active power, reactive power, displacement factor, power factor, mains frequency and/or mains voltage.

3. The system for dynamic regulation of a regenerative energy generation installation of claim 1, comprising one or several interface units for different types of energy generation units.

4. The system for dynamic regulation of a regenerative energy generation installation of claim 1, wherein passive elements of the energy generation installation are taken into account for regulation.

5. The system for dynamic regulation of a regenerative energy generation installation of claim 1, comprising a signal output for information feedback to a superordinate system.

6. The system for dynamic regulation of a regenerative energy generation installation of claim 1, wherein the set value is received by a superordinate system.

7. A regenerative energy generation installation comprising a plurality of energy generation units, comprising a system for dynamic regulation of the energy generation installation according to claim 1.

8. The regenerative energy generation installation of claim 7, wherein the energy generation unit is an inverter or rectifier.

9. The regenerative energy generation installation of claim 7, comprising a photovoltaic energy generation installation.

10. The system for dynamic regulation of a regenerative energy installation of claim 1, wherein the additional measured values of the energy generation units comprise availability, load and/or capacity of the energy generation units.

11. The system for dynamic regulation of a regenerative energy generation installation of claim 1, wherein the energy generation units are inverters and the additional measured values of the inverters are processed to regulate the system in order to integrate availability, load and/or operating point of the inverters.

12. The system for dynamic regulation of a regenerative energy generation installation of claim 1, wherein the system comprises one or more bidirectional interfaces to measuring devices to include a regulation based upon measured values of the energy generation installation and external data.

13. The system for dynamic regulation of a regenerative energy generation installation of claim 12, wherein the measured values of the energy generation installation and external data are real-time insulation data, temperature, wind and/or weather forecast.

14. The system for dynamic regulation of a regenerative energy generation installation of claim 12, wherein additional input data for the regulating device comprises energy forecast values for a primary energy supply and/or load demand in an energy network.

15. A method for regulating a regenerative energy generation installation comprising a plurality of energy generation units, comprising:
receiving a set value,
measuring an actual value at a grid connection point of the energy generation installation, and
regulating the individual energy generation units for regulating the actual value to set value,
wherein the set value originates as individual values or a common vector from a control computer of the energy generation installation,
processing further measured values from the energy generation units, and
wherein the regulating stabilizes a displacement factor to a fixed, pre-determined value or stabilizes the displacement factor to a variable value pre-determined by a network operator via a process control interface, at a network connection point when regulating the actual value to the set value.

16. The regulating method of claim 15, wherein the current availability and load of all installation components are included in a regulation calculation.

17. The regulating method of claim 15, wherein further measured values from the energy generation installation and/or external measured values are processed.

18. A system for regulating a regenerative energy generation installation comprising a plurality of energy generation units, comprising
a signal input for receiving a pre-determined set value for the energy generation installation,
a measuring device for measuring an actual value at a grid connection point of the energy generation installation, and
a regulating device for regulating the actual value to the set value by regulating the individual energy generation units, and
wherein the set value originates as individual values or a common vector from a control computer of the energy generation installation,
wherein the regulating device processes additional measured values of the energy generation units, and
wherein the regulating device stabilizes a displacement factor to a fixed, pre-determined value or stabilizes the displacement factor to a variable value pre-determined by a network operator via a process control interface, at a network connection point when regulating the actual value to the set value.

19. A system for regulating a regenerative energy generation installation comprising a plurality of energy generation units, comprising
a signal input for receiving a pre-determined set value,
a measuring device for measuring an actual value at a grid connection point of the energy generation installation, and
a regulating device for regulating the actual value to the set value by regulating the individual energy generation units,
wherein the regulating device processes additional measured values of the energy generation units,
wherein the regulating device is a PID controller, and
wherein the regulating stabilizes a displacement factor to a fixed, pre-determined value or stabilizes the displacement factor to a variable value pre-determined by a network operator via a process control interface, at a network connection point when regulating the actual value to the set value.

* * * * *